United States Patent [19]
Groginsky

[11] 3,818,478
[45] June 18, 1974

[54] CODED NAVIGATION SYSTEM

[75] Inventor: Herbert L. Groginsky, Wellesley, Mass.

[73] Assignee: Raytheon Company, Lexington, Mass.

[22] Filed: Aug. 14, 1972

[21] Appl. No.: 280,320

[52] U.S. Cl. ..... 343/106 R, 235/150.26, 343/108 M
[51] Int. Cl. .............................................. G01s 1/66
[58] Field of Search ................... 343/108 M, 106 R; 235/150.26

[56] References Cited
UNITED STATES PATENTS
2,609,534   9/1952   Taylor ............................. 343/106 R
3,012,243   12/1961   Nelli et al. ...................... 343/106 R Primary Examiner—Richard A. Farley
Assistant Examiner—Richard E. Berger
Attorney, Agent, or Firm—J. D. Pannone; Milton D. Bartlett; D. M. Warren

[57]  ABSTRACT

In a navigation system in which a beam of radiation is utilized for communicating information to a vehicle, such as an aircraft approaching a landing strip, there is provided a pseudo-noise generated binary code having sequentially generated bits ordered in a sequence of nonrepeating subsequences with each of these bits uniquely representing a value of a coordinate describing the position of the beam of radiation. For example, with an azimuthally scanned beam of radiation, each bit in the code represents an increment in the azimuth angle while the digits of one of the subsequences is sufficient to uniquely determine the azimuth angle. An encoder and a decoder, each similarly structured with a shift register and feedback logic, are disclosed.

9 Claims, 6 Drawing Figures

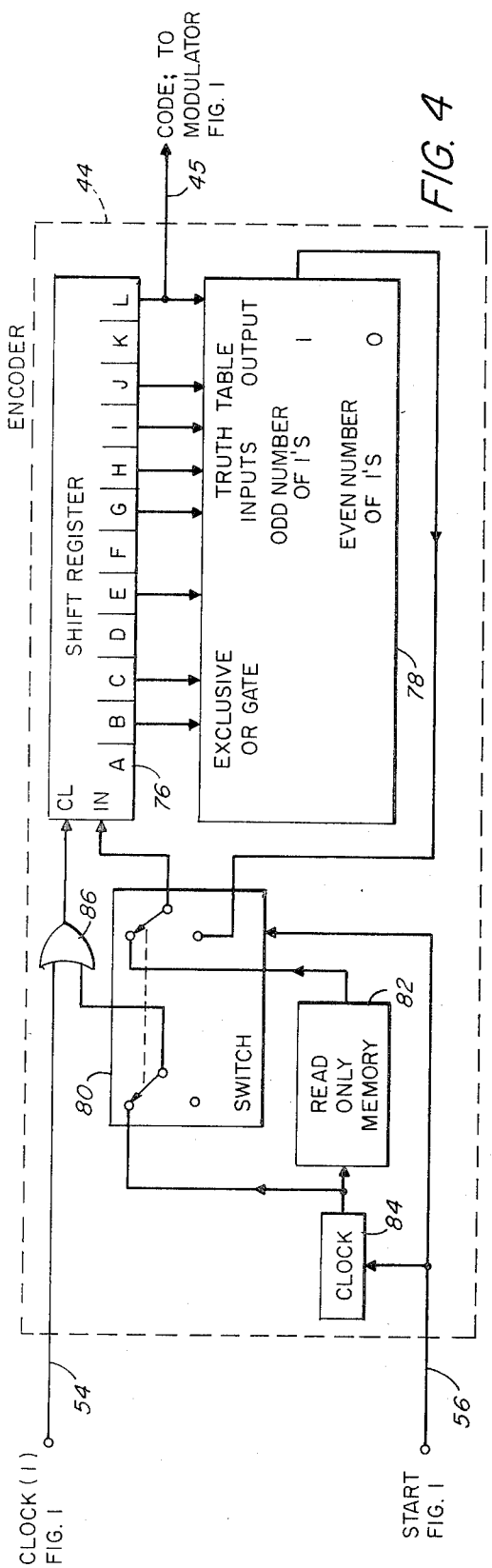
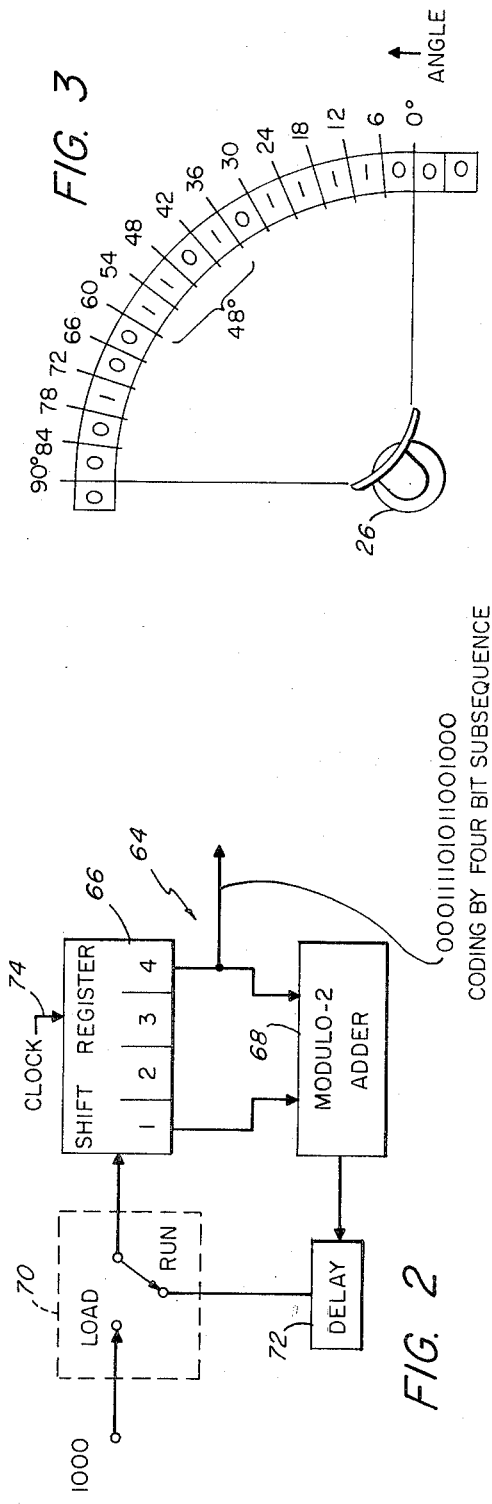
FIG. 4
FIG. 3
FIG. 2

CODED NAVIGATION SYSTEM

BACKGROUND OF THE INVENTION

Navigation systems such as instrument landing systems (ILS) are often used for guiding vehicles, particularly aircraft in the vicinity of an aircraft runway. It has been found that the use of scanning beams of radiation have an advantage over fixedly oriented beams of radiation for communicating with aircraft at low elevations since the scanning procedure tends to average out perturbations in the directivity pattern of such radiation caused by fluctuations in the terrain in the vicinity of an antenna providing a scanning beam. Furthermore, a scanned beam can communicate with aircraft having differing azimuthal directions around an antenna radiating this beam, thereby greatly increasing the capacity of an instrument landing system in simultaneously guiding many aircraft. An aircraft illuminated by a beam of radiation in the typical instrument landing system needs position data of the beam, and in the situation where the beam is being scanned, such position data must be continuously and accurately updated at a rate commensurate with the rate of motion of the beam. A problem arises in that modern aircraft fly at high speeds thereby requiring a high rate of position data with great accuracy. Obtaining the necessary accuracy has heretofore been hindered by bandwidth limitations and the desirability of maintaining relative simplicity of equipment on board the vehicle which is being navigated.

SUMMARY OF THE INVENTION

The foregoing problems of the prior art are overcome and other advantages are provided by a navigation system which, in accordance with the invention, provides for a coding of a scanning beam of radiation with a sequence of nonrepeating subsequences of binary coded signals each of which consists of only one bit. An encoder and a decoder are operated in synchronism with the motion of the scanning beam such that each bit of the code corresponds to a particular position of the beam and the signals contained within any one subsequence of the code are sufficient to uniquely determine the position of the beam. The encoder is typically placed within the ground equipment utilized in generating the scanning beam of radiation, with modulation equipment being provided for modulating the code onto the carrier of the radiation. The decoder is typically carried by the vehicle within navigation equipment which receives the radiant energy of the beam when the beam is illuminating the vehicle. In one embodiment of the invention, a synchronization signal such as a tone modulated on the carrier synchronizes clock signals of the encoder and of the decoder with the position of the beam. Alternatively, synchronization can be attained by utilizing a signal waveform wherein, in a sequence of digital signals each of which represents a logic state of 1, a succession of individual pulses may be provided in which the value of the waveform returns to zero between each pulse in the manner of clock pulses. The invention provides for simplicity of equipment in that the encoder and the decoder comprise substantially the same equipment, namely, a shift register and logic circuitry with the logic circuitry accepting parallel outputs from the shift register and feeding back to the shift register a single bit having a value depending on the preceding state of data stored within the shift register. The shift register in the decoder, in the preferred embodiment of the invention, is of a bidirectional form, in which data is advanced through the shift register in a first direction during an acquisition phase of the signal processing, the shift register being operated in a reverse direction during the decoding operation. An additional logic circuit is coupled to the shift register of the decoder to provide for a prediction or correlation type circuitry during the acquisition phase of the signal processing, this providing a many-fold increase in the accuracy and precision of the measurement.

BRIEF DESCRIPTION OF THE DRAWINGS

The aforementioned aspects and other features of the invention are explained in the following description taken in connection with the accompanying drawings wherein:

FIG. 2 is a block diagram of a simplified model of a code generator generating a 4-bit code of which any sequence of four adjacent bits is nonrepeating;

FIG. 3 is a diagrammatic representation showing individual angles of orientation of the antenna of FIG. 1 with corresponding bits of the code of FIG. 2;

FIG. 4 is a block diagram of an encoder utilized in the system of FIG. 1;

DESCRIPTION OF THE PREFERRED EMBODIMENT

Figure 1:
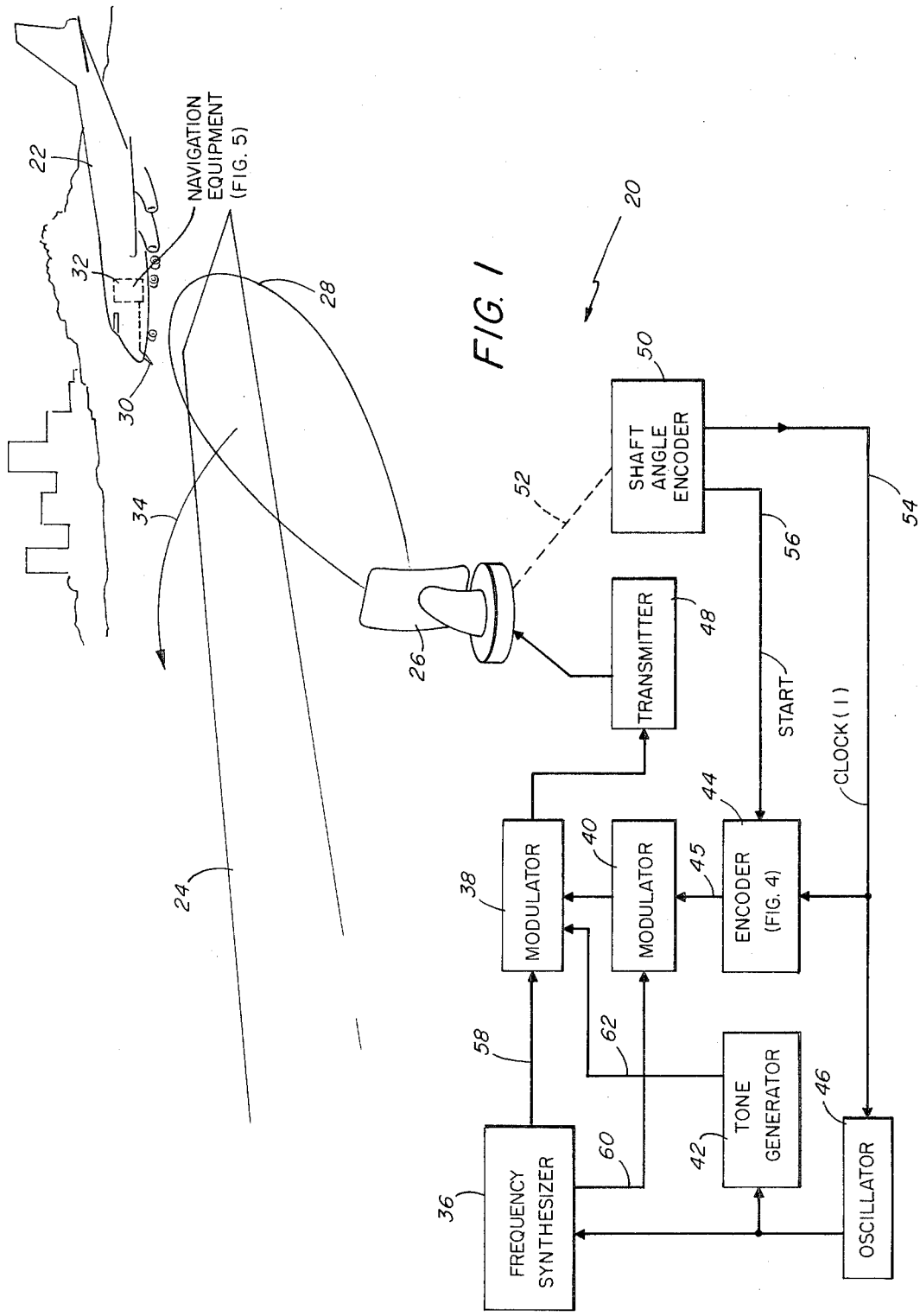
FIG. 1 is a pictorial view, partially in block diagram form, of a navigation system utilized in guiding an aircraft towards an airport runway.

Referring now to FIG. 1, there is shown a system 20 which provides for the navigation of vehicles such as the guiding of an aircraft 22 to a runway 24. The system 20 comprises ground-based equipment in the form of an antenna 26 which radiates a beam 28 of radiation towards the aircraft 22, the beam 28 being incident upon an antenna 30 via which electrical signals carried by the beam 28 are communicated to navigation equipment 32 on board the aircraft 22. The antenna 26 is seen scanning the beam 28 in an azimuthal direction, as indicated by the arrow 34, for providing azimuthal data to the aircraft 22.

The system 20 further comprises a frequency synthesizer 36, two modulators 38 and 40, a tone generator 42, an encoder 44 for generating a code on line 45, an oscillator 46, and a transmitter 48 and shaft angle encoder 50 both of which are well known in the radar art. The shaft angle encoder 50 is mechanically coupled via line 52 to the antenna 26 and provides a series of pulses as the antenna 26 rotates, each of these pulses being synchronized with a particular position of the antenna 26 and serving as clock pulses indicated by the legend "clock(1)" on line 54. The shaft angle encoder 50 also provides a start pulse on line 56 to the encoder 44 to synchronize the beginning of a code generated by the encoder 44 with a predetermined position of the antenna 26.

The oscillator 46 is locked to the clock signal on line 54. The oscillator 46 drives the frequency synthesizer 36 and the tone generator 42. The frequency synthesizer 36 provides on line 58 a carrier frequency which is applied via the modulator 38 to the transmitter 48 which, in turn, transmits energy at the carrier frequency to the antenna 26. While it is understood that there are a number of suitable methods for modulating information upon a carrier, the modulation in a preferred embodiment of the system 20 is accomplished with the aid of a subcarrier generated by the frequency synthesizer 36 on line 60 and applied to the modulator 40. The code of encoder 44 is first modulated by modulator 40 onto the subcarrier of line 60, and the modulated subcarrier is, in turn, modulated by modulator 38 onto the carrier of line 60. A timing signal provided by the tone generator 42 on line 62 in the form of a tone is also modulated by the modulator 38 onto the carrier of line 58. Thus the complete signal transmitted by the transmitter 48 comprises the code of line 45 and the tone of line 62 modulated on the carrier of line 58.

The frequency of the subcarrier on line 60 differs sufficiently from the frequency of the tone on line 62 so that the spectrum of the code on line 45 can be separated from the tone on line 62, in a manner to be described, by the navigation equipment 32 in the aircraft 22. The tone on line 62 will be utilized for synchronizing the navigation equipment 32 with the position of the antenna 26 as will be seen in the description of the navigation equipment 32 in FIG. 5. The synchronizing of the code on line 45 as well as specific details in the generation of this code will be described hereinafter with reference to FIGS. 2, 3 and 4. The utilization of the code to provide the azimuthal angular orientation of the antenna 26 will be seen in the description of the navigation equipment 32 with reference to FIG. 5. The modulation provided by the modulators 38 and 40 is typically a phase modulation of the carrier and subcarrier respectively. It should also be understood that while the antenna 26 is seen scanning in azimuth, the invention also contemplates the utilization of the encoder 44 with an antenna (not shown) scanning in elevation.

In accordance with the invention, the code of the encoder 44 is a sequence of binary signals having a logic 1 or a logic 0, this sequence comprising a series of nonrepeating subsequences which are of equal length. Each of these binary signals has a one-to-one correspondence with each increment in the angle of antenna 26, and each subsequence uniquely identifies the angle of the antenna 26. This code is more readily described by reference to a simplified form of this code presented in FIGS. 2 and 3, while the code utilized in the preferred embodiment is a longer code and is generated by the equipment disclosed in FIG. 4.

Referring now to FIGS. 2 and 3 there are shown respectively a simplified code generator 64 and a sector scan by the antenna 26 of FIG. 1. The code sequence shown in both FIGS. 2 and 3 consists of 15 bits, and is of the class of sequences known as a maximal length binary shift register sequence. The code generator 64 is seen comprising a shift register 66, a modulo-2-adder 68 (equivalent logically to an exclusive OR circuit), a switch 70 and a delay 72. As a practical matter, the delay 72 is usually incorporated into commercially available shift registers in the form of a master slave circuit connected to the input terminal of the shift register. This enables the shift register 66 to read the output of the modulo-2-adder 68 in response to the leading edge of a clock signal on line 74 before shifting the contents of the shift register 66 in response to the trailing edge of the clock signal on line 74. The code is generated by first loading the number 1000 by the switch 70 into the cells respectively 1, 2, 3 and 4 of the shift register 66 and then placing the switch 70 in the RUN position. The outputs of the modulo-2-adder are then successively clocked into the first cell of the shift register 66 while the contents of the fourth cell are permitted to overflow. Different codes having the uniqueness requisite can be obtained by utilizing a shift register and one or more modulo-2 adders, the particular code of FIG. 2 being obtained by a single modulo-2 adder connected to the cells 1 and 4 of the shift register 66. The output of the code generator 64 may be taken from any cell of the shift register 66, the difference in outputs being merely a difference in phase. It is readily verified by examination of the output sequence that any group of four digits completely locates that group or subsequence of digits within the complete sequence. The same comment applies to the sector diagram of FIG. 3 in which case, by way of example, the four bracketed digits identify the angle 48°.

As can be seen in FIG. 3, a new bit of the digital code is generated every time the beam moves a fixed angular increment. As was seen in the mechanical scanning arrangement of FIG. 1, the incrementing of the bits of the code sequence is synchronized to an incrementing in the angular orientation of the antenna 26 by virtue of the physical connection of the shaft angle encoder 50 the antenna 26. In the case of an electronic scanning antenna (not shown in the figures), the encoder and electronic circuitry utilized in positioning the beam are both driven by clock pulses obtained from a single clock thereby maintaining the required synchronism between the code and the beam position.

The codes provided by the encoders 44 and 64 of FIGS. 1 and 2 are frequently referred to as a pseudonoise (PN) code since the occurrences of the digits in the code sequence resemble the occurrences of digits in a random sequence; and similarly, the spectral distribution of the code sequence resembles that of a random sequence. This permits more efficient use of the spectrum than is provided by, for example, an analog swept frequency signal of the prior art although the informational bandwidth is the same for both signals. The format of the code as demonstrated in FIG. 3 represents a significant advantage over the use of multibit codes provided by standard optical shaft encoders wherein a multibit binary number if provided for each increment of antenna angle while, here, a single bit suffices to identify each such increment in antenna angle. This utilization of the code permits a substantial reduction in the required bit rate for transmission of data by the system 20 while retaining the same accuracy and resolution as is obtained with the multibit numbers provided by the standard optical shaft encoder. Further properties of this type of code are described by Golomb, *Shift REgister Sequences*, Holding-Day, Inc., San Francisco, 1967.

Referring now to FIG. 4, there is seen a block diagram of the encoder 44 utilized in the preferred embodiment of the invention. The encoder 44 utilizes a 12-bit shift register 76 for generating a PN code having 12-bit subsequences rather than the 4-bit subsequence of FIGS. 2 and 3. The total length of the sequence is 4095 bits which provide coding for 360° of scanning in increments of less than one-tenth of a degree. In the preferred embodiment the bit rate transmitted by the transmitter 48 of FIG. 1 is 50,000 bits per second. The PN code contains a great deal of internal redundancy since each bit is related to the previous subsequence of bits by the feedback logic function as was described earlier with reference to the modulo-2 adder 68 of FIG. 2. In FIG. 4 a 12-bit feedback logic function is provided by gate 78 and switch 80, the gate 78 being an exclusive OR gate having a truth table as is shown in the figure. The operation of the shift register 76, the gate 78 and the switch 80 of FIG. 4 is similar to that of the corresponding components of FIG. 2, namely, the shift register 66, the modulo-2 adder 68 and the switch 70 except for the fact that the sequence provided by FIG. 2 is 15 bits long while that of FIG. 4 is 4095 bits long.

The code of FIG. 4, like that of FIG. 2, is a sequence composed of nonrepeating subsequences (of 12-bit lengths in FIG. 4) and has the form of a maximal length binary shift register sequence. Since these maximal length binary sequences are formed in a manner wherein any one bit is produced from the preceding subsequence of bits, a 12-bit sequence from the code of FIG. 4 can be utilized to predict the value of the next bit, and similarly the next bit can be utilized in the prediction of the values of still further bits. A prediction circuit utilizing this feature of the maximal length binary code will be described hereinafter with reference to the navigation equipment of FIG. 5. In particular, it is noted that such a prediction circuit provides for a correlation type of detection in which each bit received at the aircraft 22 of FIG. 1 can be correlated with the predicted value of that bit thereby providing a great precision of detection.

There are a number of possible 12-bit codes that could serve as an angle code. The code utilized in Fig. 4 is obtained by connecting only the shift register cells labeled B, C, E, G, H, I, J and L to the gate 78. In the preferred embodiment, the width of the beam 28 of FIG. 1 is sufficiently wide such that at least 20 bits will be received between the 3 dB (decibels) points on the directivity pattern of the beam.

Continuing with the description of FIG. 4, there is seen a memory 82 and a clock 84, the memory 82 being a read-only memory connected via the switch 80 to the input of the shift register 76. The clock 84 is connected via this switch 80 and an OR gate 86 to the clock input of the shift register 76. In operation, the shift register 76 is loaded with an initial sequence of binary digits in response to the start signal on line 56 of FIG. 1. The start signal operates the switch 80 and places the switch contacts in the positions as shown in FIG. 4 for loading the shift register 76. During the start signal, the clock 84 provides clock pulse signals which sequentially shift each binary digit from the memory 82 into the successive cells of the shift register 76. The clock 84 provides clock pulses at a much higher pulse repetition rate than that of the clock signal on line 54 so that this loading or initializing of the shift register 76 can be accomplished before the antenna 26 of FIG. 1 rotates one angular increment. At the termination of the start signal on line 56, the switch 80 reverts to its alternate state wherein the clock 84 and the memory 82 are disconnected from the shift register 76, and the output signal of the gate 78 is connected to the input of the shift register 76. Thereafter, with each succeeding clock(1) signal coupled via the OR gate 86 to the shift register 76, successive bits of the code appear on line 45.

Figure 5:
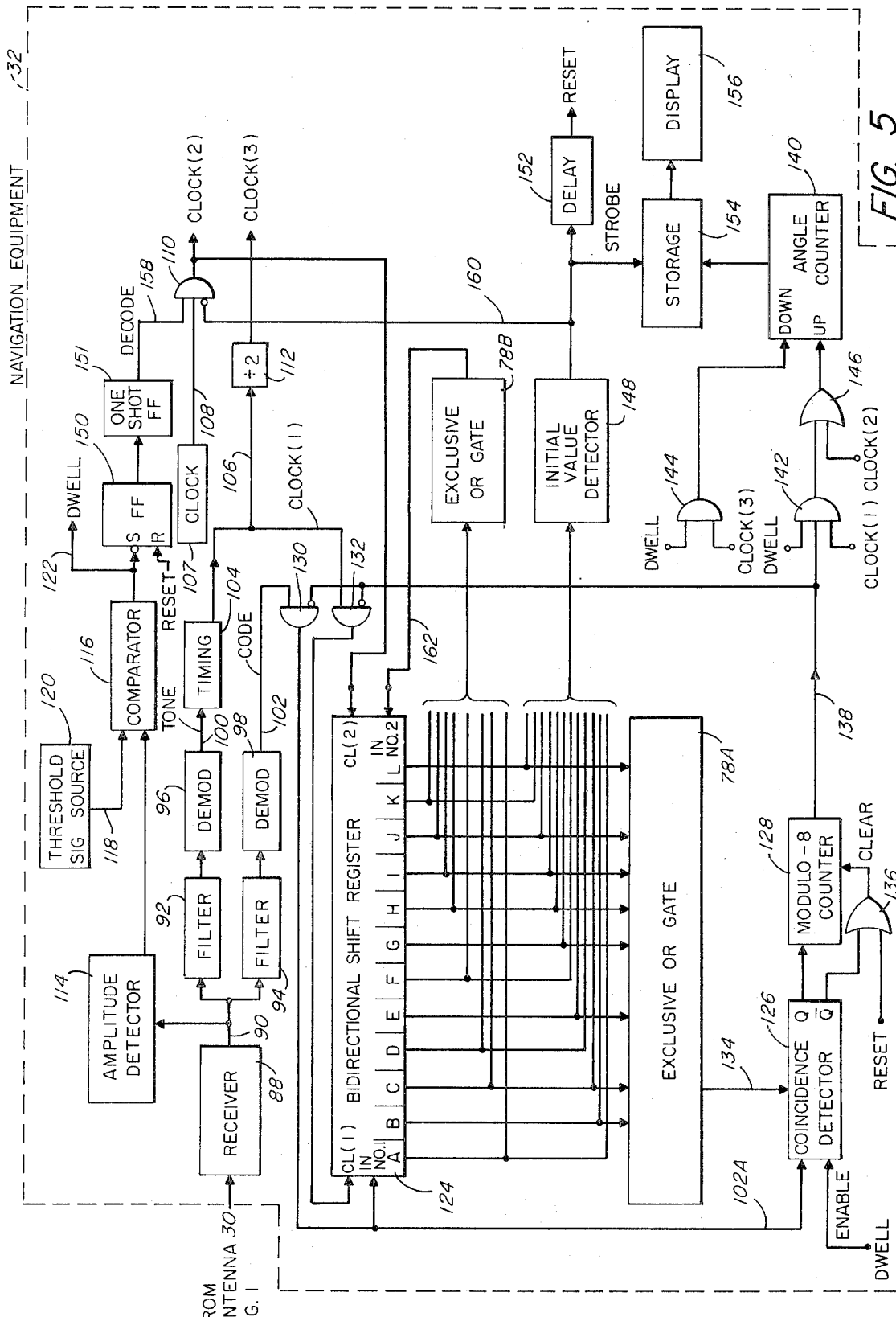
FIG. 5 is a block diagram of a decoder utilized in the navigation equipment carried onboard the aircraft of FIG. 1.

Referring now to FIG. 5, there is shown a block diagram of the navigation equipment 32, also seen in FIG. 1. The navigation equipment 32 comprises a receiver 88 which is coupled to the antenna 30 of FIG. 1 and converts the radio frequency signal of the antenna 30 to an intermediate frequency signal which appears on line 90. The intermediate frequency signal on line 90 is filtered by filters 92 and 94 and then demodulated by demodulators 96 and 98 to extract respectively the tone on line 100 and the code on line 102 which were originally generated by the tone generator 42 and the encoder 44 of FIG. 1. The tone on line 100 is applied to a timing unit 104 which provides on line 106 a clock pulse signal having the same frequency and being phase locked to the pulse train signal on line 54 of FIG. 1, and is accordingly labeled clock(1) in FIG. 5. A clock 107, which may comprise a high frequency oscillator, provides a high frequency clock signal via line 108 and AND gate 110. The clock signal on line 108 is of a higher frequency than the clock signal on line 106 and is indicated in the figure by the legend clock(2). The clock signal on line 106 is also applied to a frequency divider 112, such as a flip-flop circuit, which divides the repetition rate by a factor of two to provide a clock pulse signal which has half the frequency of the clock(1) signal and is indicated by the legend clock(3). The frequency divider 112 also delays the clock(3) signal relative to the clock(1) signal so that the two signals can be applied respectively to the DOWN and UP terminals of an angle counter to be described, hereinafter.

The intermediate frequency signal on line 90 is also applied to a detector 114 which detects the amplitude of the signal on line 90 and applies the amplitude to a comparator 116 which compares this amplitude against a reference threshold signal provided on line 118 by a threshold signal source 120. The comparator 116 provides a signal labeled "Dwell" on line 122 having a logic level of 1 when the amplitude of the signal on line 90 is greater than the threshold on 118 and a logic level of 0 when the signal on line 90 has a lower amplitude than the threshold signal on line 118. The threshold signal source 120 is set to provide a threshold which equals the amplitude of the signal on line 90 when the aircraft 22 of FIG. 1 flies through a region of the beam 28 having a preset amplitude, such as the 3 dB points. Thus the logic 1 state of the dwell time signal on line 122 represents the amount of time that the aircraft 22 dwells within the beam 28.

The navigation equipment 32 includes a predicting and correlating circuit which comprises a bidirectional shift register 124, such as type SN7495N by Texas Instruments, gate 78A which is the same as gate 78 previously described with reference to FIG. 4, a coincidence detector 126, a counter 128 and a pair of AND gates 130 and 132. The operation of the prediction circuitry closely approximates that of the encoder circuit 44 of FIG. 4. The prediction circuitry begins operation as the aircraft 22 of FIG. 1 enters the beam 28 at which time the dwell time signal on line 122 enables the coincidence detector 126. At this time the AND gates 130 and 132 are conducting the code of line 102 and the clock(1) signals to the shift register 124. The shift register 124 is now shifting binary signals from its left end towards the right. At this time, the AND gate 110 is closed so that no clock(2) pulses appear at the shift register 124.

Figure 6:
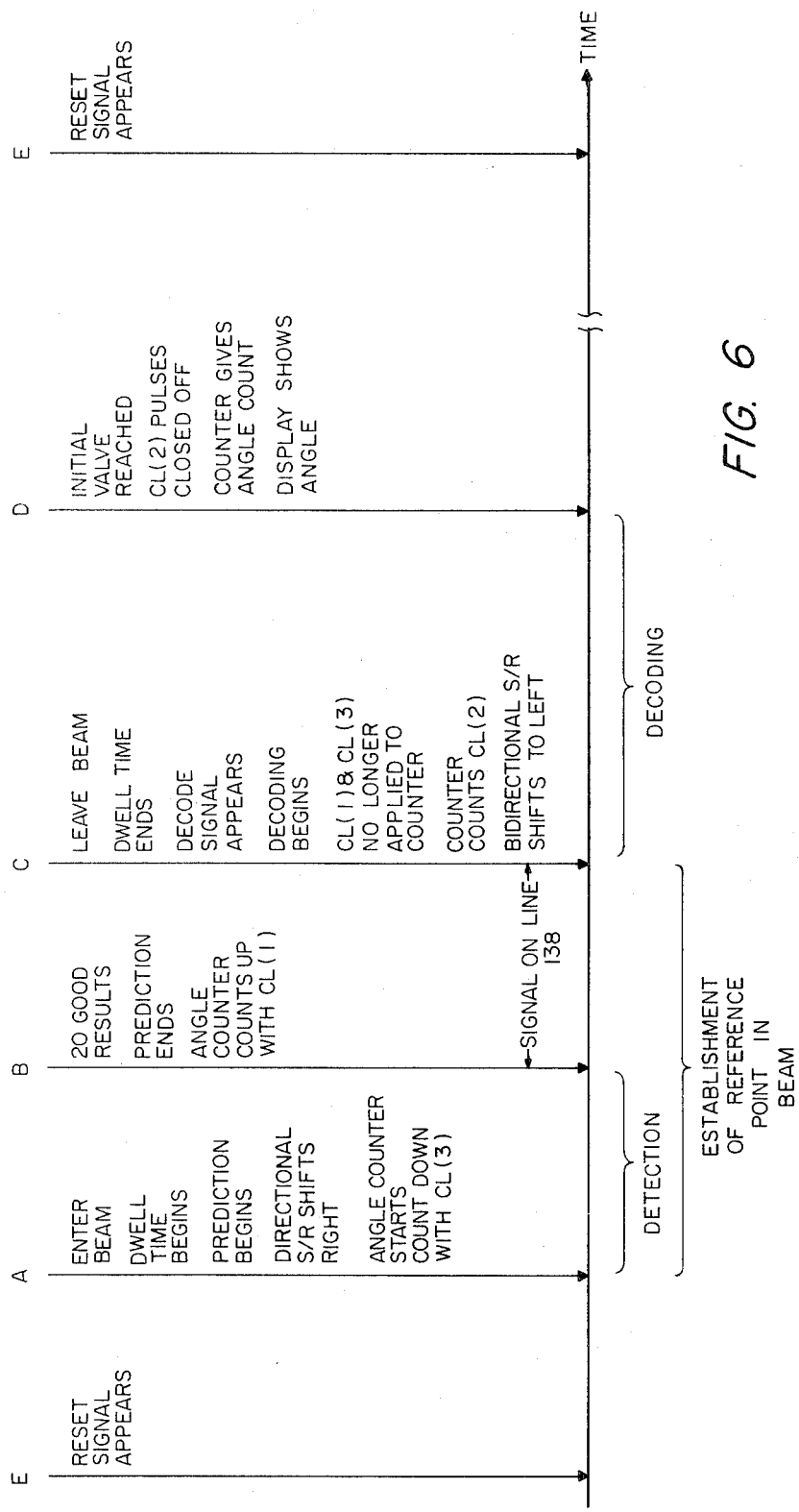
FIG. 6 is a timing diagram useful in exploring the operation of the navigation equipment of FIG. 5.

With reference to the timing diagram of FIG. 6, it is seen that the entry of the aircraft 22 into the beam 28 of FIG. 1, the beginning of the dwell time signal on line 122 of FIG. 5, and the beginning of the prediction operation are seen to occur at a time indicated by the legend A. Reference will be made to this timing diagram during the ensuing discussion on the operation of the navigation equipment 32.

The prediction operation continues in a manner analogous to the operation of the encoder 44 of FIG. 4. At the beginning of the prediction operation the shift register 124 has the same contents as appears in the shift register 76 of FIG. 4, except for the possibility of some incorrect binary digits due to noise caused by a relatively weak signal when the aircraft 22 of FIG. 1 is in a portion of the beam having only moderate signal strength. However, as the aircraft enters a region of the beam 28 having adequate signal strength, the effect of noise is diminished sufficiently so that the shift register 124 has, to a very high probability, the same contents as the shift register 76 of FIG. 4. The high signal region is presumed to occur when the dwell time signal appears on line 122.

During the prediction or acquisition operation of the navigation equipment 32, the gate 78A provides the next output pulse of the code sequence in the same manner as does the gate 78 of FIG. 4 since these two gates are coupled to their respective shift registers 124 and 76 in the identical manner. The coincidence detector 126 is presumed to have a master slave input which momentarily stores the predicted pulse provided by the gate 78A until the next pulse generated by the encoder 44 arrives at the aircraft 22 and then makes a comparison of these two signals, namely, the output of gate 78A on line 134 and the next code pulse on line 102A. If these two signals agree, a logic 1 state appears at the Q output while a logic state of zero appears at the $\overline{Q}$ output of the coincidence detector 126. If the signals on the lines 102A and 134 are not the same, then the output signals of the coincidence detector 126 are reversed. The counter 128 counts each logic 1 signal appearing from terminal Q and is cleared to a state of all zeros whenever a logic 1 is applied from the $\overline{Q}$ output of the coincidence detector 126 to the counter 128 via OR gate 136.

With respect to the counting of the counter 128, it is noted that while as a matter of chance, from time to time the pulse on line 134 may equal the pulse on line 102A, a succession of these equalities can only occur if the code signal on line 102 and 102A is substantially noise free in which case the contents of the shift register 124 of FIG. 5 is substantially the same as the contents of the shift register 76 of FIG. 4. The counter 128 is a modulo-8 counter which provides a signal on line 138 whenever a cuccession of eight equalities appear on the pair of lines 102A and 134. Since one inequality is sufficient to clear the counter 128, it is apparent that a count of 8 can only occur during a condition of high signal strength at the receiver 88 in which case the contents of the shift register 124 are equal to the contents of the shift register 76. This occurs at the time B on the timing diagram of FIG. 6.

Since the prediction circuitry provides for a comparison of a predicted signal on line 134 with the incoming signal on line 102A, it is apparent that this operation is equivalent to that of a correlation receiver and produces a very high accuracy and precision in accordance with the length of the correlating interval or sequence. Since the timing unit 104 of FIG. 5 is synchronized with the timing signal on line 54 of FIG. 4 and the encoder 44, this correlation is readily accomplished independently of the speed or rotation of the antenna 26 of FIG. 1 and also independently of any perturbations in the speed of its rotation. The length of the correlating interval or sequence can be increased by increasing the maximum count of the counter 128; however, it has been found that with a 12-bit subsequence to the code, a count of eight by the counter 128 produces such a high accuracy and precision that a higher count is not required.

The presence of the signal on line 138 indicates not only that eight correct predictions have been made, but furthermore, that at the first prediction the contents of the two shift registers 124 and 44 of FIGS. 5 and 4 must have been equal thus indicating that a total of 12 plus 8, namely, 20 successive bits were correctly received. In the event that the aircraft 22 of FIG. 1 happens to be off course and misses the high signal region of beam 28, well known circuitry (not shown in the figures) is preferably connected to the prediction circuitry to provide an indication warning the pilot of the aircraft 22 that the signal strength is too low. For example, such a warning indicator circuit may comprise a counter of dwell time signals which is reset by the modulo-8 counter 128 and which triggers a warning light if the dwell time count becomes excessively high.

With the appearance of the signal on line 138, the prediction or acquisition phase is terminated as is indicated at time B in the timing diagram of FIG. 6. The signal on line 138 has a logic value of 1 and is applied to the complemented inputs of the AND gates 130 and 132 thereby shutting off the flow of further code pulses on line 102A and the pulses of the clock(1) signal.

The next step in the operation of the navigation equipment 32 is the establishing of a point of reference (typically on the centerline) within the beam 28 of FIG. 1 at which point the beam angle measurement, to be described subsequently, will be made. The reference point takes the form of a numerical correction added to the beam angle measurement. This correction is made by obtaining a measure of the width of the beam 28 of FIG. 1, scaling this width measurement, and subtracting it from the angle subtended by the portion of the beam 28 passing by the aircraft 22 of FIG. 1 between the times B and C on the timing diagram. The width measurement is accomplished by counting the clock(3) pulses during the dwell time interval between times A and C on the timing diagram. The width measurement is scaled by a factor of one-half since the clock(3) frequency is half the clock(1) frequency. The aNgle subtended by the portion of the beam 28 passing by the aircraft 22 between the times B and C is measured by counting the clock(1) pulses occurring during the interval between times B and C. The counting of clock(1) pulses provides the point relative to the trailing edge of the beam (as indicated by the end of the dwell time) where the angle measurement is made. In order to reference the beam angle measurement to the center of the beam rather than to the trailing edge of the beam, one-half the beam width, as measured by the counting of the clock(3) pulses, is subtracted from the clock(1) measurement. The subtraction of these two counts gives the numerical correction which is to be added to the angle measurement. The two counting operations as well as the subtraction operation, and the beam angle measurement are accomplished by the use of a single UP/DOWN counter, shown as angle counter 140, in the following manner.

The reference point is established by means of the angle counter 140 which counts DOWN the clock(3) signal and counts UP the clock(1) signal to give a resultant count which is the difference between the two counts. During the interval between times B and C, the clock(1) signal is passed by AND gate 142 in response to the presence of both the dwell time signal and the signal on line 138. During the interval between times A and C, the clock(3) signal is passed by AND gate 144 in response to the presence of the dwell time signal. The clock(3) signal passed by AND gate 144 is coupled directly to the DOWN terminal of the angle counter 140, and the clock(1) signal passed by the AND gate 142 is coupled via OR gate 146 to the UP terminal of the angle counter 140. The angle counter 140 increments its count for each clock pulse received at its UP terminal while decrementing its count for each clock pulse received at its DOWN terminal. The aforementioned delay of the frequency divider 112 ensures that pulses do not arrive simultaneously at both the UP and DOWN terminals thereby permitting the angle counter 140 to count both UP and DOWN. The resultant count accumulated by the counter 140 during the interval from time A to time C represents an angular increment to be added to the beam angle measurement so that this measurement is relative to the center of the beam 28 of FIG. 1. At time C on the timing diagram, the aircraft 22 passes the second 3 dB point of the beam 28 whereupon the dwell time signal on line 122 terminates thereby shutting off the flow of the clock pulses of the clock(1) and the clock(3) signals to the counter 140.

The third phase of the operation of the navigation equipment 32 is the decoding phase in which a measurement of the angular orientation of the beam 28 is obtained. The decoding circuitry comprises the shift register 124 which was described previously with reference to the prediction circuitry, a gate 78B which is identical to the gate 78A except for its interconnections with the individual cells of the shift register 124, a detector 148, a flip-flop 150, a monostable multivibrator often referred to as a "one shot" flip-flop 151 which resets itself a fixed time delay after being triggered by the flip-flop 150, a delay unit 152, a storage unit 154 and a display 156 which may have, by way of example, a numeric readout comprised of light emitting diodes. The decoding operation begins at time C on the timing diagram of FIG. 6 and terminates at time D. The trailing edge of the dwell time signal which occurs at time C triggers the flip-flop 150 to provide, via flip-flop 151, a decode signal having a logic state of 1 on line 158, the decode signal in combination with a signal, to be described hereinafter, on line 160 enabling the AND gate 110 to pass the clock pulses of the clock(2) signal to the shift register 124. Due to the bi-directional characteristic of the shift register 124, the presence of the clock(2) signal shifts data from the second input terminal towards the left. It is noted that the output of the gate 78B is connected via line 162 to the second input of the shift register 124 in an analogous manner to the connection of the output of the gate 78 of FIG. 4 to the shift register 76. The result of this interconnectionn is that, upon the occurrence of the trailing edge of the dwell time signal at time C, the shift register 124 in cooperation with the gate 78B proceeds to generate the maximal length code in reverse order such that the sequence of binary digits appearing at a cell of the shift register 124 is exactly the reverse of the sequence of digits appearing at the corresponding cell of the shift register 76 of FIG. 4.

This feature of the invention wherein the shift register 124 is operated in a reverse direction permits a decoding of the maximal length shift register code without the use of a storage medium storing all 4095 digits of the code sequence. The decoding is accomplished by stopping the reverse operation when the initial subsequence is present in the cells of the shift register 124, and then counting the number of shifts applied to the shift register 124 by the clock(2) signal in bringing the code subsequence down to its initial set of digits from the set of digits present in the shift register 124 at the time C of the timing diagram in FIG. 6. The detector 148 is coupled to each of the cells of the shift register 124 and provides an output signal on line 160 having a logic state of 1 if and only if the set of digits corresponding to the initial subsequence is present in the cells of the shift register 124. The detector 148 typically comprises, for example, a multiple input AND gate in which selected inputs are complemented. The signal on line 160 indicating the initial values of the subsequence occurs at time D on the timing diagram.

The counting of the number of shifts applied to the shift register 124 by the clock(2) signal is accomplished by feeding the clock(2) signal via the OR gate 146 to the UP terminal of the counter 140 during the interval of time between time C and time D. Thus, as has already been mentioned, the clock(2) signal is enabled by the decode signal at time C. The clock(2) signal is terminated by the appearance of the initial value signal on line 160 which is applied to the complemented input of the AND gate 110. The initial value signal on line 160 also strobes the storage unit 154 to read the contents of the counter 140 at time D, and to present this count to the display 156, the display 156 including a suitable scale factor so that the number displayed is equal to the angle of orientation of the beam 28 of FIG. 1 at time C.

The delay unit 152, in response to the initial value signal on line 160, provides a reset signal a fixed time delay after the initial value signal. The delay is the interval of time between the times D and E on the timing diagram and is slightly less than the scanning period of the beam 28 of FIG. 1 so that no new data will appear on the display 156 from spurious radiation such as a sidelobe of the radiation pattern of the antenna 26. The delay unit 152 applies the reset signal to the flip-flop 150 and to the OR gate 136. It is noted that the application of the dwell time signal to the coincidence detector 126 insures that both the coincidence detector 126 as well as the counter 128 will remain inactive during the decoding interval since the termination of the dwell time signal at the inception of the decoding interval deactivates the coincidence detector 126. Thus, there can be no change in the value of the signal on line 138 until such time as either the dwell time signal reappears or the reset signal applied via the OR gate 136 clears the counter 128. The resetting of the flip-flop 150 permits the dwell time signal, upon its next occurrence, to trigger the flip-flop 150 which in turn triggers the one-shot flip-flop 151 to provide the decode signal.

It is understood that the above-described embodiment of the invention is illustrative only and that modifications thereof will occur to those skilled in the art. Accordingly, it is desired that this invention is not to be limited to the embodiment disclosed disclosed herein but is to be limited only as defined by the appended claims.

What is claimed is:

1. A system comprising in combination:
   means for modulating a beam of radiant energy with information relative to the position of said beam, said modulating means including means for encoding said information with a sequence of binary signals, said sequence comprising a plurality of nonrepetitive subsequences of binary signals, each of said binary signals being associated with a position of said beam;
   means spaced apart from said beam modulating means for demodulating said nonrepetitive subsequences of binary signals;
   means coupled to said demodulating means for predicting the next binary signal of said sequence; and
   means coupled to said predicting means for counting the number of said predictions for extracting said information to determine said position.

2. The system according to claim 1 wherein said modulating means further comprises means synchronized with said beam position for transmitting a timing signal towards said demodulating means.

3. A navigation system comprising in combination:
   means for modulating a beam of radiant energy with information relative to the position of said beam, said modulating means including means for encoding said information with a sequence of binary signals, said sequence comprising a plurality of nonrepetitive subsequences of binary signals, each of said binary signals being associated with a position of said beam;
   means, responsive to said radiant energy and carried by a vehicle illuminated with said radiant energy for extracting said information to determine the position of said beam, said modulating means further comprising means synchronized with said beam position for transmitting a timing signal towards said vehicle, said timing signal and said binary signals being modulated on a carrier of said radiant energy, and wherein said extracting means comprises:
   means for demodulating said timing signal and said binary signals from said carrier; and
   means responsive to said binary signals for predicting the next binary signal of said sequence in synchronism with said timing signal.

4. The system according to claim 3 wherein said encoding means comprises:
   a shift register;
   a logic means connected to selected parallel outputs of said shift register, said logic means providing a binary one signal when an odd number of binary one signals appear on said parallel outputs, said logic means providing a binary zero signal when an even number of binary one signals appear on said selected parallel outputs;
   means for initializing the binary signals of said shift register; and
   means for inserting the outputs of said logic means into said shift register.

5. The system according to claim 4 wherein said extracting means comprises means coupled to said predicting means for counting the number of said predictions; and
   means responsive to said counting means for inhibiting the passage of further ones of said binary signals to said predicting means when a preset number of said predictions has proved correct.

6. The system according to claim 5 wherein said predicting means comprises:
   a data register having means for shifting binary signals in a first direction;
   a logic means being connected to selected parallel outputs of said register, said logic means providing a logic one signal when an odd number of said selected register outputs have a value of one, said logic means providing a logic zero signal when an even number of said selected register outputs have a value of logic one; and
   a coincidence detector coupled to said logic means and to said demodulating means for providing a signal to said prediction counting means whenever a signal provided by said logic means equals the next signal from said demodulating means, said signal provided by said coincidence detector indicating the correctness of each of said predictions.

7. A system according to claim 6 wherein said extracting means further comprises:
   a source of threshold signal;
   a detector of the amplitude of received radiant energy; and
   means for comparing said amplitude of received radiant energy with said threshold signal, said comparing means providing a signal during an interval of time in which said vehicle is illuminated by said radiant energy.

8. The system according to claim 7 wherein said predicting means is enabled by said time interval signal of said comparator.

9. The system according to claim 5 wherein said extracting means comprises means, coupled to said demodulating means and to said counting means, for decoding a sequence of said binary signals, said decoding means comprising:
   a data register having means for shifting binary signals in a first direction and in a second direction, said register being initially loaded with a sequence of said binary signals by shifting said binary signals in said first direction;
   a logic means being connected to selected parallel outputs of said register, said logic means providing a logic one signal when an odd number of said selected register outputs have a logic value of one, said logic means providing a logic zero signal when an even number of said selected register outputs have a logic value of one, the output signals of said logic means being coupled to an input of said register;
   a source of clock signals for shifting said output signals of said logic means in said register in said second direction;
   means coupled to said outputs of said register for detecting the presence of a predetermined set of output signals, said detecting means being coupled to said source of clock signals for impeding said clock signals when said predetermined set of outputs is present at said data register; and means for counting the clock signals of said source of clock signals during said shifting of data in said register in said second direction, the count of said clock counting means representing the position of said beam.

* * * * *